H. C. WEITZEL.
SIDE DUMPING WAGON.
APPLICATION FILED NOV. 13, 1919.

1,346,575.  Patented July 13, 1920.

Inventor:
Henry C. Weitzel
By Chapin A Ferguson
Attorney.

UNITED STATES PATENT OFFICE.

HENRY C. WEITZEL, OF BALTIMORE, MARYLAND.

SIDE-DUMPING WAGON.

1,346,575.  Specification of Letters Patent.  Patented July 13, 1920.

Application filed November 13, 1919. Serial No. 337,795.

*To all whom it may concern:*

Be it known that I, HENRY C. WEITZEL, a citizen of the United States, residing at Baltimore, in the State of Maryland, have invented certain new and useful Improvements in Side-Dumping Wagons, of which the following is a specification.

This invention relates to improvements in side dumping wagons, and has for its object to provide a wagon especially adapted for delivery of coal, and so constructed that the contents thereof may be emptied from the side without backing the wagon into the curb or in any way interfering with the traffic, on the street.

The invention consists of the novel construction and arrangement of the parts and combination of parts, hereinafter more fully set forth in the following specification and pointed out in detail in the appended claim.

In the accompanying drawing—

Figure 1:
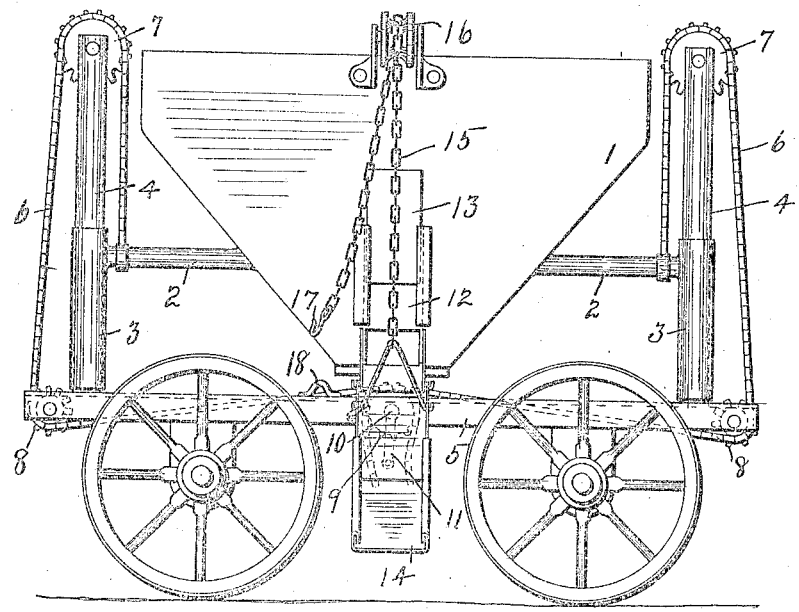
Figure 1 is a side elevation of my invention.
Figure 2:
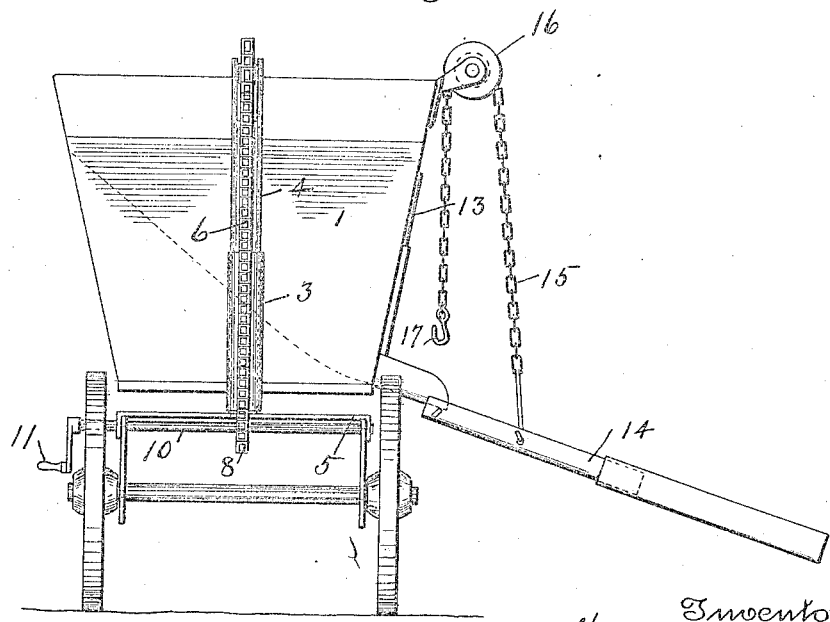
Fig. 2 is a rear end view of same.

Referring to the accompanying drawings, forming part of this specification and in which like reference numerals designate like parts throughout the several views thereof, 1 designates the body of the wagon having arms 2 on each side thereof which latter are provided at their outer ends with sleeves 3 adapted to slide up and down on the standards 4. The said standards 4 being mounted on each end of the frame 5. The arms 2 are each connected by a chain 6, which latter passes over a wheel 7 at the upper ends of said standards 4 and then passes down over the wheels 8 to the sprocket wheels 9 under the frame 5, the said sprocket wheel 9 being mounted on the shaft 10, which latter has a crank 11 on one end thereof, whereby when the shaft 10 is turned by means of the crank 11 the chains 6 will be drawn over the sprocket wheels 9, causing the body 1 to be raised on the standards 4 to any desired position. The body 1 is provided with an opening 12 at one side thereof and a door 13 for said opening. The chute 14 is connected under the opening 12 and is adapted to be raised and lowered by the chain 15, which passes over the pulley 16 and has a hook 17 adapted to catch in the eye 18 to hold the chute in the raised position.

Having thus described my invention, what I claim is—

In a side dumping wagon the combination of a frame, a standard mounted at each end of said frame, a body, arms projecting from each end of the said body and having a sleeve at the outer end, fitted over the said standards, a wheel at the upper end of each standard, a crank-shaft mounted in said frame and chains connecting each of said arms with the said crank-shaft whereby when the crank is turned the body will be raised and lowered on said standard.

In testimony whereof I affix my signature.

HENRY C. WEITZEL.